(12) United States Patent
Esswein

(10) Patent No.: US 11,203,301 B2
(45) Date of Patent: Dec. 21, 2021

(54) ACCESSORY POCKET WITH RESILIENT ARM

(71) Applicant: Gwendolyn Rene' Esswein, Franklin, KY (US)

(72) Inventor: Gwendolyn Rene' Esswein, Franklin, KY (US)

( * ) Notice: Subject to any disclaimer, the term of this patent is extended or adjusted under 35 U.S.C. 154(b) by 19 days.

(21) Appl. No.: 16/912,835

(22) Filed: Jun. 26, 2020

(65) Prior Publication Data

US 2020/0406824 A1 Dec. 31, 2020

(51) Int. Cl.
*B60R 7/04* (2006.01)
*B60N 3/10* (2006.01)

(52) U.S. Cl.
CPC ............. *B60R 7/043* (2013.01); *B60N 3/103* (2013.01)

(58) Field of Classification Search
CPC ................................ B60R 7/043; B60N 3/103
USPC ......................................... 224/275, 556, 483
See application file for complete search history.

(56) References Cited

U.S. PATENT DOCUMENTS

| | | | | |
|---|---|---|---|---|
| 3,497,119 A * | 2/1970 | Beeck | ................ | B60N 3/08 224/275 |
| 3,632,029 A * | 1/1972 | Sonner | ................ | B60N 3/08 224/275 |
| 4,678,154 A * | 7/1987 | McFarland | ............ | A47K 1/08 220/737 |
| 4,801,060 A * | 1/1989 | Thompson | ............ | B60N 3/103 224/275 |
| 5,149,032 A * | 9/1992 | Jones | ................ | A47G 23/0225 248/154 |
| 5,282,598 A * | 2/1994 | Greene | ................ | B60N 3/103 224/275 |
| 5,358,307 A * | 10/1994 | Shafer | ................ | B60R 7/043 224/275 |
| 5,383,727 A * | 1/1995 | Rife | ................ | A45C 11/00 150/900 |
| D365,567 S * | 12/1995 | Cantrell | ................ | D14/253 |
| 5,702,041 A * | 12/1997 | Sun | ................ | B60N 3/101 224/539 |
| 5,720,458 A * | 2/1998 | Carpenter | ............ | B60N 3/103 224/275 |
| 6,276,582 B1 * | 8/2001 | Alexander | ............ | B60R 7/043 217/16 |
| 6,560,983 B1 * | 5/2003 | Schimmeyer | ......... | B60N 3/103 248/311.2 |
| 6,896,164 B2 * | 5/2005 | Fialla-Dori | ............ | B60R 7/043 224/275 |
| 7,207,626 B2 * | 4/2007 | Hassett | ................ | B60N 3/103 297/188.06 |
| 7,464,988 B2 * | 12/2008 | Hassett | ................ | B60N 3/103 297/188.06 |
| 7,478,870 B2 * | 1/2009 | Hassett | ................ | B60N 3/103 297/188.06 |
| 7,481,169 B2 * | 1/2009 | Larson | ................ | B60N 3/002 108/44 |

(Continued)

*Primary Examiner* — Justin M Larson
(74) *Attorney, Agent, or Firm* — Miller & Martin PLLC; Stephen J. Stark

(57) ABSTRACT

A vehicle accessory has an arm extending from a pocket. The arm preferably has sides which can flex and then push outwardly to assist in mechanical retention between seats of a vehicle to locate the pocket in front of a seat. The pocket may have at least three sides extending upwardly relative to a bottom, if not more, and accessory may be manufactured from a single planar sheet bent to shape.

17 Claims, 3 Drawing Sheets

(56) References Cited

U.S. PATENT DOCUMENTS

| | | | | |
|---|---|---|---|---|
| 7,736,711 B2* | 6/2010 | Dobelle | ............... | A47B 95/043 |
| | | | | 428/34.1 |
| 7,758,090 B2* | 7/2010 | Gregory | ............... | B60N 2/6009 |
| | | | | 296/1.07 |
| 8,056,970 B1* | 11/2011 | Phillips | ............... | B60N 2/6009 |
| | | | | 297/182 |
| 8,162,189 B2* | 4/2012 | Robins | ............... | B60N 2/6009 |
| | | | | 224/275 |
| 8,267,291 B2* | 9/2012 | Simon | ............... | B60N 2/6009 |
| | | | | 224/275 |
| 8,282,161 B1* | 10/2012 | Jacobson | ............... | B60N 3/08 |
| | | | | 297/188.2 |
| 8,657,356 B2* | 2/2014 | Pywell | ............... | B60R 7/043 |
| | | | | 296/37.15 |
| 8,777,307 B2* | 7/2014 | Nelson | ............... | B60N 2/24 |
| | | | | 297/188.18 |
| 9,981,610 B2* | 5/2018 | Robins | ............... | B60R 7/043 |
| 10,190,339 B1* | 1/2019 | Mack | ............... | F41C 33/06 |
| 10,500,999 B1* | 12/2019 | Meyer | ............... | B60N 3/107 |
| 2003/0111499 A1* | 6/2003 | French | ............... | B60R 7/043 |
| | | | | 224/275 |
| 2007/0158377 A1* | 7/2007 | Hassett | ............... | B60R 7/043 |
| | | | | 224/275 |
| 2007/0235483 A1* | 10/2007 | Konet | ............... | B60R 7/043 |
| | | | | 224/275 |
| 2007/0241581 A1* | 10/2007 | Martin | ............... | B60N 3/00 |
| | | | | 296/37.8 |
| 2008/0272166 A1* | 11/2008 | Frank | ............... | B60R 7/04 |
| | | | | 224/544 |
| 2008/0283565 A1* | 11/2008 | Simon | ............... | B60R 11/00 |
| | | | | 224/542 |
| 2009/0127882 A1* | 5/2009 | Thibodeau | ............... | B60R 7/043 |
| | | | | 296/37.8 |
| 2009/0134688 A1* | 5/2009 | Waltman | ............... | B60N 3/101 |
| | | | | 297/463.2 |
| 2010/0231010 A1* | 9/2010 | Manley | ............... | B60N 3/103 |
| | | | | 297/182 |
| 2012/0205935 A1* | 8/2012 | Robins | ............... | B60N 2/6009 |
| | | | | 296/24.34 |
| 2013/0105533 A1* | 5/2013 | Orduno | ............... | B60R 7/043 |
| | | | | 224/275 |
| 2017/0267188 A1* | 9/2017 | Wilkinson | ............... | B60N 3/103 |
| 2018/0022291 A1* | 1/2018 | Fan | ............... | F16M 13/022 |
| | | | | 224/483 |
| 2018/0251074 A1* | 9/2018 | Wang | ............... | B60R 7/043 |
| 2020/0406824 A1* | 12/2020 | Esswein | ............... | B60R 7/043 |

* cited by examiner

ACCESSORY POCKET WITH RESILIENT ARM

CLAIM OF PRIORITY

This application claims the benefit of U.S. Provisional Patent Application Nos. 62/867,551 filed Jun. 27, 2019 and 62/892,748 filed Aug. 28, 2019 both of which are incorporated by reference in their entirety.

FIELD OF THE INVENTION

The present invention relates to a vehicle accessory pocket for use in retaining cell phones or other items close in proximity to a driver and possibly even a passenger, and more particularly to a vehicle accessory pocket having a retaining arm preferably formed of a unitary construction, with the pocket and with the arm assisting in retaining the pocket at a desired location even when loaded such a with a phone or other object(s) by friction fit against vertical sides (such as between seats or between a seat and center console, etc.).

BACKGROUND OF THE INVENTION

At least some older vehicles lack the number of compartments for storing things, particularly as it relates to center consoles near a driver and/or passenger of a vehicle, if present. Still other vehicles may lack sufficient pockets or compartments as provided by the vehicle manufacturer.

There is believed to be a need for additional compartments with pockets in at least some vehicles.

SUMMARY OF THE INVENTION

It is an object of many embodiments of the present invention to provide an improved vehicle accessory.

It is another object of many embodiments of the present invention to provide an improved vehicle accessory having a pocket which can be anchored or otherwise secured between a seat and a center console or between adjacent seats with the pocket extending in front of the seat.

It is yet another object of many embodiments of the present invention to provide an additional pocket not provided with a vehicle which can be retained with an arm extending between adjacent seats or between a seat and a center console and friction-fit to be retained against vertically extending walls thereof.

It is another object of many embodiments of the present invention to provide an improved pocket for use with vehicles such as to hold a cell phone or other use which could for at least some embodiments, be made (such as by molding in a single piece) preferably with an arm to be retained between vertically extending surfaces such as adjacent seats and/or a seat adjacent to a center console, etc.

Accordingly, in accordance with many embodiments of the present invention, a vehicle accessory pocket is provided having an arm that is preferably cantileveredly connected to the pocket and, for many embodiments, formed therewith of a unitary material such as through molding or otherwise.

The arm is also preferably constructed of a thermo formed plastic so that it may be mechanically retained intermediate to and adjacent to vertical surfaces such as the side(s) of a seat and a side of a console and/or between the seats, etc.

The arm preferably cantileveredly extends from a narrow neck terminating against a side planar surface of the pocket which then deploys then to a larger base so that the base and neck can assist in holding the pocket. The narrower (and shallower) neck may assist in placement at a desired location in an easier manner than could otherwise be provided by having an arm of unitary thickness extending the depth (or width) of the pocket.

The arm, for at least some embodiments, have a narrow width and depth (the width is preferably narrower than the depth as illustrated) and a constant width cross section. The arm may have a carrying handle construction (such as by having cutouts formed therein). When molded, the sides may displace towards one another to assist in mechanically retaining the arm of a desired position between seats. Thus, such constructions may provide a relatively easy handhold to assist in the deployment of the accessory into a desired location and/or to assist in removal. The pocket could be one of a variety of constructions. A three sided, four sided, or other construction could be utilized.

BRIEF DESCRIPTION OF THE DRAWINGS

Particular features and advantages of the present invitation will become apparent from the following description when considered in conjunction with the accompanying drawings in which.

DETAILED DESCRIPTION FOR PREFERRED EMBODIMENTS

Figure 1:
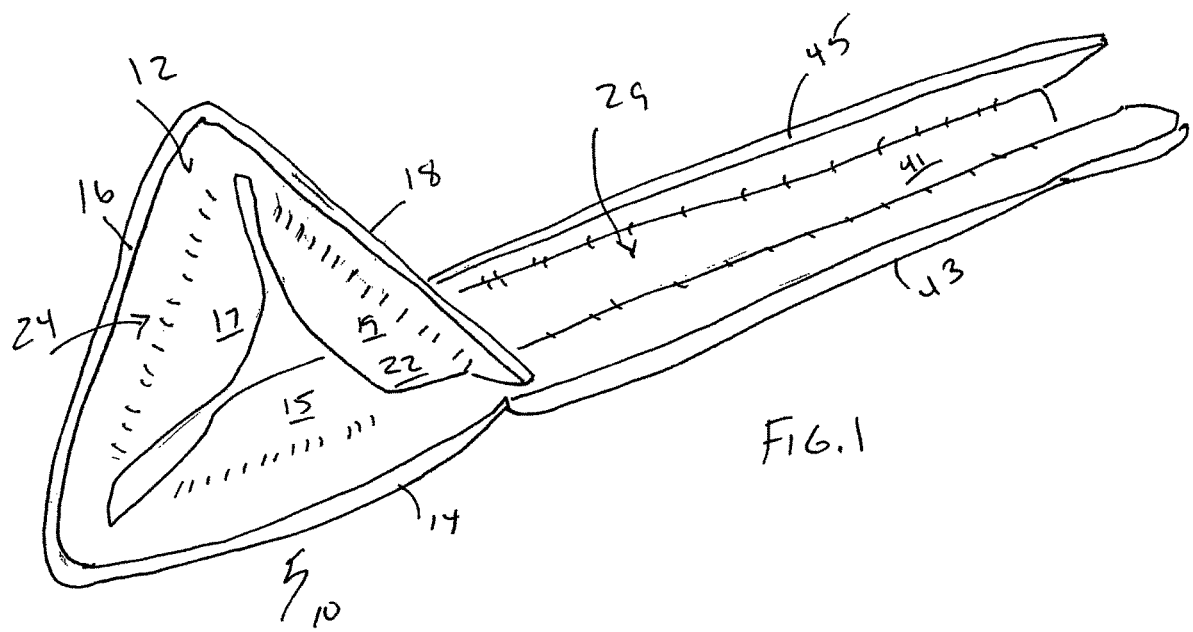
FIG. 1 is a top plan view of the presently preferred embodiment of the present invention.
Figure 3:
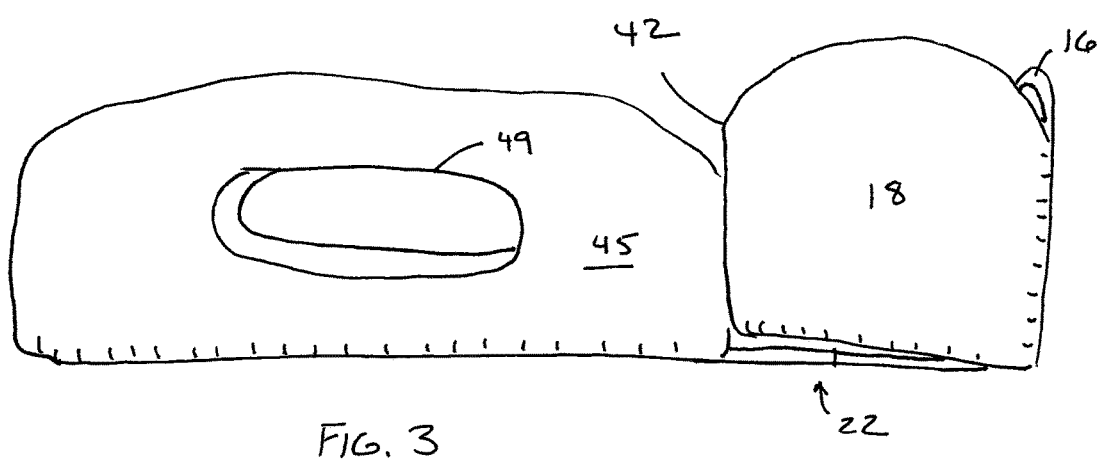
FIG. 3 is a right side plan view of the embodiment of FIGS. 1 and 2.
Figure 2:
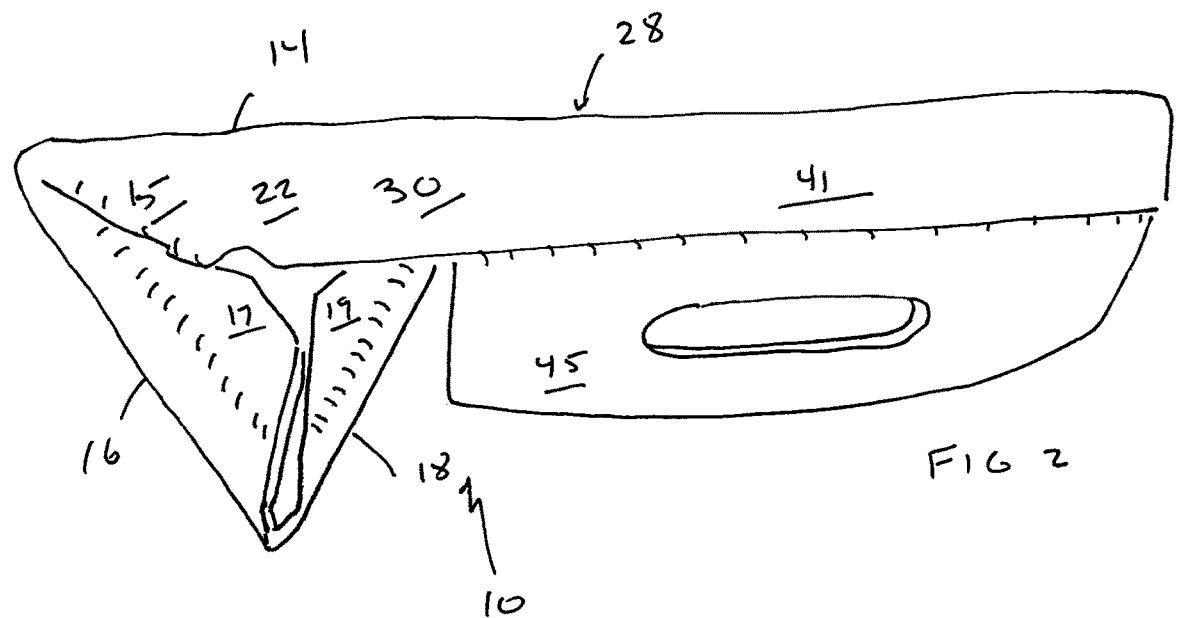
FIG. 2 is a bottom plan view of the embodiment of FIG. 1.
Figure 4:
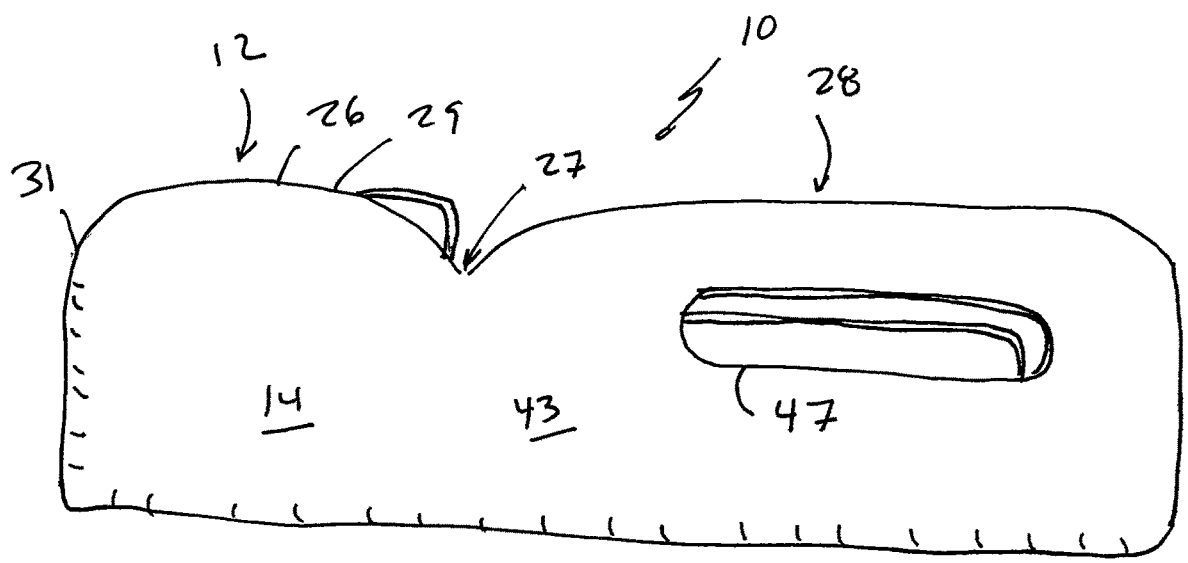
FIG. 4 is a left side plan view of the embodiment shown in FIGS. 1-3.

FIG. 1 shows an accessory 10 of the presently preferred embodiment of the present invention having a pocket 12 as can be configured with first, second, and third sidewalls 14,16,18 extending upwardly from a bottom 22 so as to define an interior cavity 24 terminating at an upper rims 26 which may preferably be planar or curved (as illustrated) about the sidewalls 14,16,18.

For many embodiments the sidewalls 14,16,18 can surround the cavity 24 to provide a substantially triangular, or possibly a square or other cross-section, about the interior cavity 24. For some embodiments the exterior dimensions of the sidewalls 14,16,18 may be about 4 to 4½ inches. The depth could also be about 3½-4 inches from the rim 26 down to an upper surface of the bottom 22.

Figure 5:
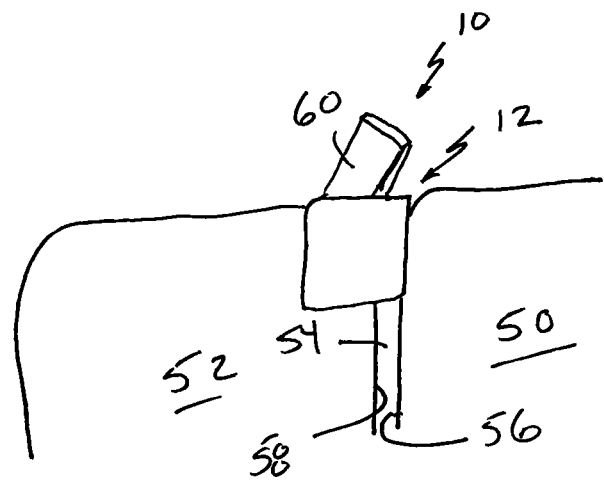
FIG. 5 is a front plan view of the embodiments of FIGS. 1-4 installed in a vehicle.
Figure 6:
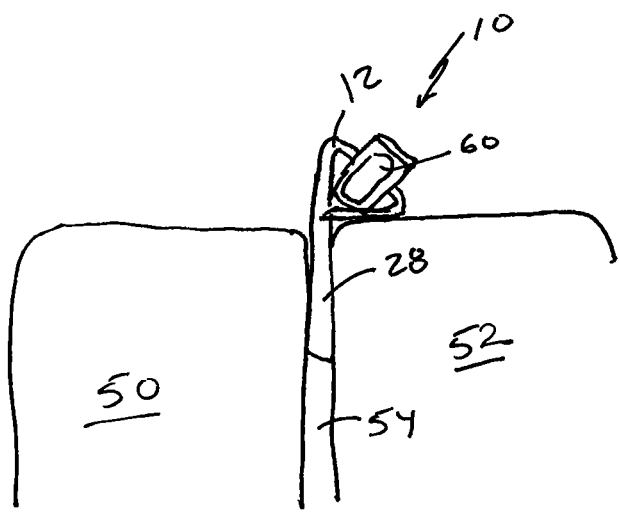
FIG. 6 is a top plan view of the embodiments of FIGS. 1-5 installed in a vehicle.

A cell phone or other item, such as shown in FIGS. 5 and 6 could be placed or wedged into the pocket 12 to assist in retaining it at a desired orientation relative to a user.

Sidewalls 14,16,18 are preferably planar for many embodiments, as can be bottom 22. Bottom 22 may be formed of bottom portions 15,17,19 which are connected to respective sidewalls 14,16,18 and possibly bent relative thereto respectively for some embodiments to form bottom 22. Other embodiments may have different configurations.

The pocket 12 may connected to an arm 28, if not integrally formed thereto, which is preferably cantileveredly connected thereto, and/or extending therefrom, such as at neck 30 could begin at or near a portion of a rim 26 such as at edge 27. The rim 26 may upwardly extend as illustrated from edge 27 above sidewall 14 to top point 29 then downwardly to opposite edge 31. The other sidewalls 16,18 may or may not be similarly constructed.

For at least many embodiments, the arm 28 may have a substantially uniform width 40 across its width as preferably made out of a thermo formed plastic material which could be preferably the same material as the pocket 12 in fact they both could be integrally formed together such as by various manufacturing techniques so as to be a single component so that there is not a weakness along the interface of edge 27 neck 30 and/or face 42 with the arm 28. The pocket 12 may be formed with bottom portions 15,17,19 so that a top portion 15 for additional strength in forming the pocket 12 which might otherwise be a point of weakness. The neck 30 could planar with bottom 41 of arm 28 and planar or almost planar with bottom portions 15,17,19. Bottom portions 15,17,19 may be spaced apart, adjacent and/or overlapping depending on the embodiment. Arm 28 may have upwardly extending cantilevered sides 43,45 from bottom 41, sides 43,45 may flex inwardly toward one another to assist the arm 28 in mechanical retention between seats. Bends may connect sides 43,45 to bottom 41. Cutouts 47,49 may be useful for carrying and/or placing the accessory 8 in position. Cutouts 47,49 may or may not be aligned as illustrated.

FIG. 5 shows the pocket 12 extending forwardly of vehicle components 50,52 (such as seat(s) and/or a center console) with the arm 28 extending in gap 54 and preferably retained in position against vertically extending wall portions 56,58. The arm 28 preferably deforms or flexes in a manner to mechanically secure the arm 28 so the pocket 12 is at a desired position that can support sufficient weight such as a cell phone 60 illustrated (particularly since some states are passing laws prohibiting drivers from holding cell phones when driving). FIG. 6 may show this embodiment better with the arm 28 extending into the gap 54 shown between the components 50,52 which could be seats or a seat and the center console, etc.

The pocket 12 is shown with its sidewall 18 angled relative to a front of the vehicle component 52, when installed for at least some embodiments, whereby the vehicle component 52 may provide some support for the pocket 12 when installed together with the arm 28. Some users may elect to space the pocket 12 from the front of the vehicle component 52.

In order to form the accessory 10 from a single sheet, a cut in the appropriate shape can be formed and then the sides 43, 45 may be bent upwardly relative to an arm bottom 41 either before or after the cutouts 47,49 have been provided. The bottom portions 15,17,19 forming the bottom 22 can be bent relative to the side walls 14,16,18 respectively and then the second wall 16 best relative to the first sidewall 14 on with the third sidewall 18 bent relative to the second sidewall 16 so that the third sidewall 18 preferably next internal to the side 45 of the arm 28 such as shown in the figures. This would place the bottom portion 19 overlapping the bottom portion 16 so as to potentially add structural stability and integrity to the pocket 12.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

For some embodiments, face 42 of sidewall 18 may contact sidewall 14 and/or wall 43 of arm 28 so as to prevent a possibility of a cell phone traveling inadvertently along arm 28, such as within well 29 between sides 43,45 above bottom 41. Additionally, bottom portions 15,17,19, may contact one another, particularly in locations without overlap, so as to prevent articles from passing through the bottom 22.

What is claimed is:

1. A vehicle accessory comprising:
    a pocket having at least first, second and third sidewalls upwardly-extending relative to a bottom to define an interior, said sidewalls terminating at upper rims;
    an arm cantileveredly connected to the pocket, said arm having opposing resilient sides, said sides flexing inwardly, and then outwardly to exert outward pressure for mechanically securing the arm between vehicle seats when installed; and
    wherein the pocket has a triangular cross section.

2. A vehicle accessory comprising:
    a pocket having at least first, second and third sidewalls upwardly extending relative to a bottom to define an interior, said sidewalls terminating at upper rims;
    an arm cantileveredly connected to the pocket, said arm having opposing resilient sides, said sides flexing inwardly, and then outwardly to exert outward pressure for mechanically securing the arm between vehicle seats when installed; and
    wherein the bottom is formed of first, second and third bottom portions connected to and bent relative to the respective first, second and third sidewalls.

3. The vehicle accessory of claim 2 wherein the third bottom portion overlaps the first bottom portion.

4. The vehicle accessory of claim 3 wherein the sides of the arm upwardly extend from an arm bottom and are spaced apart and the third sidewall terminates between the sides of the arm.

5. A vehicle accessory comprising:
    a pocket having at least first, second and third sidewalls upwardly extending relative to a bottom to define an interior, said sidewalls terminating at upper rims;
    an arm cantileveredly connected to the pocket, said arm having opposing resilient sides, said sides flexing inwardly, and then outwardly to exert outward pressure for mechanically securing the arm between vehicle seats when installed; and
    wherein the sides of the arm upwardly extend from an arm bottom and are spaced apart.

6. The vehicle accessory of claim 5 wherein the sides have corresponding cutouts providing a handhold.

7. The vehicle accessory of claim 5 wherein the sides are parallel.

8. The vehicle accessory of claim 5 where the arm is connected to the pocket at a neck.

9. The vehicle accessory of claim 8 wherein the neck has a height less than a maximum height of one of the sidewalls and sides.

10. The vehicle accessory of claim 5 wherein the bottom is formed of first, second and third bottom portions connected to the respective first, second and third sidewalls, and the arm bottom is parallel to the first bottom portion.

11. The vehicle accessory of claim 10 wherein the arm bottom is coplanar with the first bottom portion.

12. A vehicle accessory comprising:
    a pocket having at least first, second and third sidewalls upwardly extending relative to a bottom to define an interior, said sidewalls terminating at upper rims;

an arm cantileveredly connected to the pocket, said arm having opposing resilient sides, said sides flexing inwardly, and then outwardly to exert outward pressure for mechanically securing the arm between vehicle seats when installed; and wherein the arm and pocket are formed from a single planar sheet bent into the pocket and arm.

13. A vehicle accessory comprising:
a pocket having at least first, second and third sidewalls upwardly extending relative to a bottom to define an interior, said sidewalls terminating at upper rims;
an arm cantileveredly connected to the pocket, said arm having opposing resilient sides, said sides flexing inwardly, and then outwardly to exert outward pressure for mechanically securing the arm between vehicle seats when installed; and
wherein a width between the sides of the arm is uniform.

14. A vehicle accessory comprising:
a pocket having at least first, second and third sidewalls upwardly extending relative to a bottom to define an interior, said sidewalls terminating at upper rims;
an arm cantileveredly connected to the pocket, said arm having opposing resilient sides and an arm bottom, said sides flexing inwardly, and then outwardly to exert outward pressure for mechanically securing the arm between vehicle seats when installed; and
wherein the bottom of the pocket is formed of first, second and third bottom portions connected to the respective first, second and third sidewalls, and the arm bottom is parallel to the first bottom portion.

15. The vehicle accessory of claim 14 wherein the arm has an arm bottom coplanar with the first bottom portion.

16. A vehicle accessory comprising:
a pocket having at least first, second and third sidewalls upwardly extending relative to a bottom to define an interior, said sidewalls terminating at upper rims;
an arm cantileveredly connected to the pocket, said arm having opposing resilient sides, said sides flexing inwardly, and then outwardly to exert outward pressure for mechanically securing the arm between vehicle seats when installed; and
wherein the second sidewall is connected to and is located intermediate the first and third sidewalls, and the third sidewall is not fixedly secured to the first sidewall.

17. A vehicle accessory comprising:
a pocket having at least first, second and third sidewalls upwardly extending relative to a bottom to define an interior, said sidewalls terminating at upper rims;
an arm cantileveredly connected to the pocket, said arm having opposing resilient sides, said sides flexing inwardly, and then outwardly to exert outward pressure for mechanically securing the arm between vehicle seats when installed; and
wherein the first sidewall is coplanar with one of the sides of the arm.

* * * * *